United States Patent
Li et al.

(10) Patent No.: US 9,452,822 B2
(45) Date of Patent: Sep. 27, 2016

(54) METHODS AND APPARATUS FOR PROVIDING SERVO TORQUE CONTROL WITH LOAD COMPENSATION FOR PILOT IN THE LOOP

(71) Applicant: HONEYWELL INTERNATIONAL INC., Morristown, NJ (US)

(72) Inventors: Xiaohong Linda Li, Plymouth, MN (US); Kent Stange, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 100 days.

(21) Appl. No.: 14/504,853

(22) Filed: Oct. 2, 2014

(65) Prior Publication Data

US 2016/0096616 A1    Apr. 7, 2016

(51) Int. Cl.
| | |
|---|---|
| *B64C 13/16* | (2006.01) |
| *B64C 13/50* | (2006.01) |
| *B64C 13/04* | (2006.01) |
| *B64C 13/30* | (2006.01) |

(52) U.S. Cl.
CPC ............ *B64C 13/16* (2013.01); *B64C 13/30* (2013.01)

(58) Field of Classification Search
CPC ........................................ B64C 13/00–13/503
See application file for complete search history.

(56) References Cited

U.S. PATENT DOCUMENTS

| | | | |
|---|---|---|---|
| 5,589,749 A | 12/1996 | Davidson et al. | |
| 7,108,232 B2 * | 9/2006 | Hoh | B64C 13/04 244/223 |
| 7,295,905 B2 | 11/2007 | Yao et al. | |
| 8,195,346 B1 * | 6/2012 | Duerksen | G05D 1/0055 701/15 |
| 2008/0156939 A1 | 7/2008 | Hanlon et al. | |
| 2012/0078446 A1 * | 3/2012 | Cameron | G05B 11/01 701/3 |

* cited by examiner

*Primary Examiner* — Jerrah Edwards
*Assistant Examiner* — Adam Mott
(74) *Attorney, Agent, or Firm* — Lorenz & Kopf, LLP

(57) ABSTRACT

A method for operating a mechanical flight control system is provided. The method provides a torque command to a servo torque control loop, wherein the servo torque control loop comprises at least one position control servo; receives at least one feedback signal from the position control servo, during operation of the position control servo; detects user external load disturbance input to the servo torque control loop, based on the at least one feedback signal; and adjusts operation of the position control servo, based on the detected user external load disturbance input.

15 Claims, 7 Drawing Sheets

METHODS AND APPARATUS FOR PROVIDING SERVO TORQUE CONTROL WITH LOAD COMPENSATION FOR PILOT IN THE LOOP

TECHNICAL FIELD

Embodiments of the subject matter described herein relate generally to the utilization of torque controlled servos with user input, provided by a flight crew member, in the actuation loop during aircraft flight envelope protection operation. More particularly, embodiments of the subject matter relate to providing load compensation to the servo controller when a flight crew member is aiding the torque controlled servo through a position controlled command.

BACKGROUND

An aircraft is generally associated with a flight envelope that describes its safe performance limits. Flight envelope protection (FEP) design can deter or prevent the pilot from making control inputs that would put the aircraft outside of these predefined, safe performance limits. In fly-by-wire controlled aircraft, various forms of envelope protection have been implemented in both military and commercial aircraft. The FEP systems in fly-by-wire controlled aircraft are unsuited for mechanically controlled aircraft because the mechanical link between the control yoke and control surfaces of the aircraft does not allow for independent movement of the yoke or surface. In a mechanical flight control system, it is desirable to provide the pilot with a resistance force that can be felt via the pilot's hand on one or more control mechanisms, using a torque controlled servo when the pilot is manually flying the aircraft outside the flight envelope. This torque controlled servo should provide little or no resistance force that may be felt by the pilot when the pilot is intentionally performing the recovery maneuver and bringing the aircraft back inside the flight envelope.

One example of a servo is a flight control actuation servo, such as that used by a typical autopilot system on an aircraft. Flight control actuation servos used by most autopilots are typically designed with very high mechanical advantage in order to supply sufficient torque on the control surfaces while using the smallest and lightest direct current (DC) motor possible within the servo. In these designs, when the autopilot is engaged, the autopilot servo alone will drive the control surfaces, and is not back-drivable by the pilot. In order to contribute to manipulation of the flight control surfaces, the pilot must either disengage the autopilot or forcibly overpower it. In older actuation servos, overpowering the servo caused a slip-clutch to slip or a shear pin to break. In newer actuation servos, overpowering the servo results in electronic clutch disengagement when the sensed motor current monitored by a current loop within the servo exceeds a predefined threshold. Under normal flight operations, the aircraft flight control actuation servo, after engaged, is operated exclusively by the autopilot, with no commanding force being provided by the pilot through the mechanical linkage. Here, the pilot is "not in the loop," and the pilot is not operating the aircraft flight control system. A flight control actuation servo is generally a position controlled device with aircraft control surface displacement (position) being the feedback signal or equivalently servo pushrod travel displacement as feedback. Thus, the position loop control is the basic operating mode for most of the flight control actuation servos when operating on the aircraft primary control surfaces, e.g., aileron, elevator, and rudder. In this design, the sensed motor current is utilized to produce an additional torque controlled operating mode for the servo.

For purposes of this application, the actuation servo is used as the torque controlled device while the pilot is providing control torque to the aircraft control surfaces, thus the "pilot in the loop" condition. In this case, the surface control is not an either/or proposition, (either the pilot or autopilot, but not both) but rather, both the servo's applied torques and the pilot's manually applied torque contribute to the deflection of the flight control surfaces. There are two potential interactions between the pilot and an actuation servo under this pilot in the loop condition: (1) the pilot's torque resists the servo torque; or (2) the pilot's torque aids the servo torque. Furthermore, when the pilot's torque aids the servo torque under condition (2) and when the actuation servo's motion starts lagging behind the pilot induced surface motion, the servo generates a significant resistance torque induced by a back electromotive force (EMF). It is known that the motor torque produced by back EMF is in the opposite direction with the turning direction of the servo and that the magnitude of back EMF increases with rotational speed. This back EMF force feels like a "kick back" on a control mechanism in the pilot's hands, creating difficulty for a pilot to perform a recovery maneuver.

Accordingly, it is desirable to provide a system for compensating this pilot aiding load and mitigating this back EMF force, which may be felt by the pilot's hands, when the pilot is intentionally performing a recovery maneuver to bring the aircraft within the constraints of the flight envelope. Furthermore, other desirable features and characteristics will become apparent from the subsequent detailed description and the appended claims, taken in conjunction with the accompanying drawings and the foregoing technical field and background.

BRIEF SUMMARY OF EMBODIMENTS

Some embodiments provide a method for operating a mechanical flight control system. The method provides a torque command to a servo torque control loop, wherein the servo torque control loop comprises at least one position control servo; receives at least one feedback signal from the position control servo, during operation of the position control servo; detects user external load disturbance input to the servo torque control loop, based on the at least one feedback signal; and adjusts operation of the position control servo, based on the detected user external load disturbance input.

Some embodiments provide a system for operating a servo torque control loop of an aircraft. The system includes a flight envelope protection (FEP) module, configured to provide a set of FEP limits for the operation of the aircraft, wherein the servo torque control loop comprises at least one position control servo; a feedback analysis module, configured to receive and analyze a feedback signal from the position control servo during operation of the position control servo; and a servo control module, configured to operate the position control servo in the aircraft within the set of FEP limits provided by the FEP module, and to adjust operation of the position control servo based on analysis of the feedback analysis module.

Some embodiments provide a non-transitory, computer-readable medium containing instructions thereon, which, when executed by a processor, perform a method. The method analyzes a feedback signal from a position control servo of a servo torque control loop of an aircraft to determine whether a user has provided external load disturbance input to the servo torque control loop, wherein the feedback signal is analyzed during operation of the position control servo; and adjusts operation of the position control servo, based on user external load disturbance input indicated by the feedback signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for providing servo torque control with load compensation for a flight crew member in the loop. More specifically, the subject matter relates to a torque controlled servo with load compensation utilized in flight envelope protection. In certain embodiments, the servo of a mechanical flight control system, during operation, provides current and position feedback signals that are analyzed to determine whether a flight crew member has provided torque input which has induced excessive (derived) acceleration and/or undesired back electromotive force (EMF). Commands of the servo are then adjusted to provide load compensation accordingly.

Figure 1:
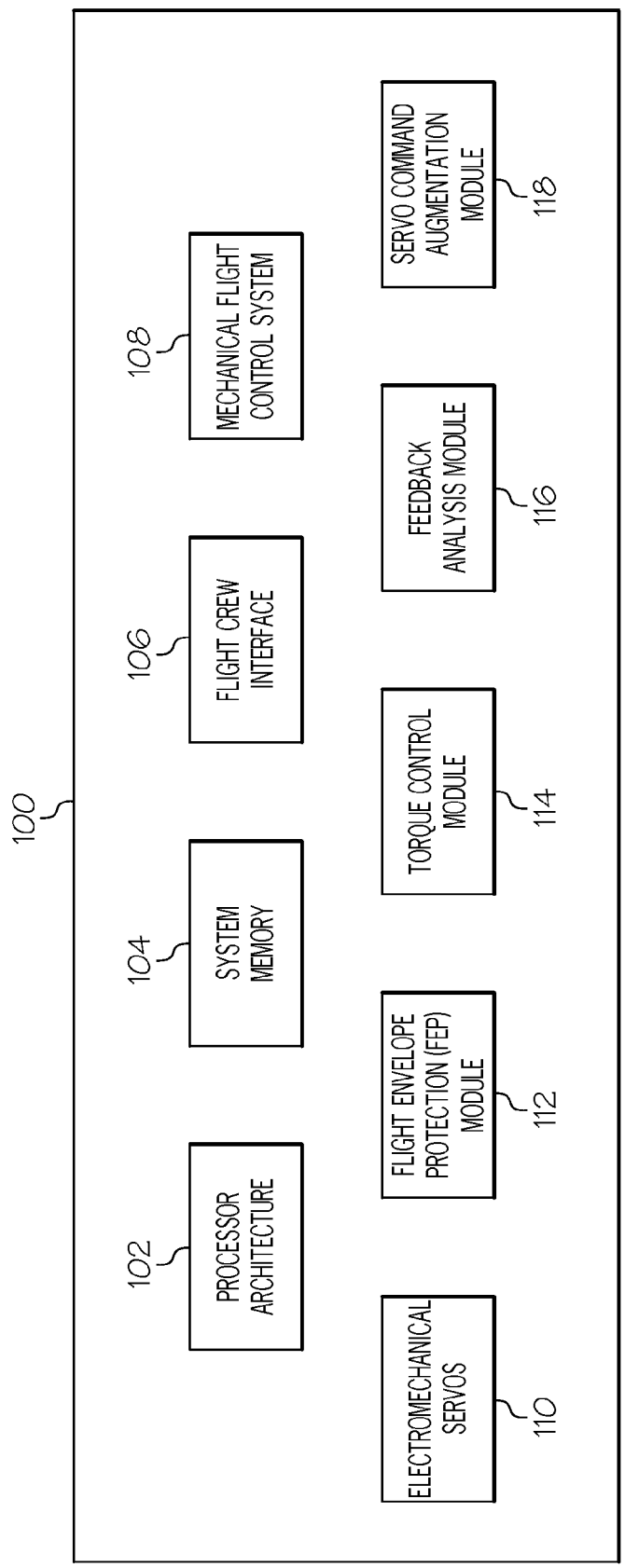
FIG. 1 is a schematic block diagram representation of a load compensation system for an aircraft flight control actuation system, according to some embodiments.

Turning now to the figures, FIG. 1 is a schematic block diagram representation of a load compensation system 100 for an aircraft, according to some embodiments. The load compensation system 100 may be implemented using any desired platform, and will generally be implemented in conjunction with an aircraft having a mechanical flight control system 108 operating in conjunction with one or more torque controlled servos 110. For example, the load compensation system 100 could be realized as any of the following, without limitation: a specialized piece of equipment, an embedded processor-based device or system, or any other device that includes a processor architecture 102 and system memory 104.

The load compensation system 100 may include, without limitation: a processor architecture 102; system memory 104; a flight crew interface 106; a mechanical flight control system 108; one or more torque controlled, electromechanical servos 110; a flight envelope protection (FEP) module 112; a torque control module 114; a feedback analysis module 116; and a servo command augmentation module 118. In practice, various embodiments of the load compensation system 100 may include additional or alternative elements and components, as desired for the particular application. These elements and features of the load compensation system 100 may be operatively associated with one another, coupled to one another, or otherwise configured to cooperate with one another as needed to support the desired functionality—in particular, providing features specific to load compensation for a mechanical flight control system, as described herein. For ease of illustration and clarity, the various physical, electrical, and logical couplings and interconnections for these elements and features are not depicted in FIG. 1. Moreover, it should be appreciated that embodiments of the load compensation system 100 will include other elements, modules, and features that cooperate to support the desired functionality. For simplicity, FIG. 1 only depicts certain elements that relate to the load compensation features described in more detail below.

The processor architecture 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems. Alternatively, the processor architecture 102 is not implemented using a microcontroller or processor; in this case, the load compensation system 100 utilizes microcontroller and/or processor components relevant to a particular application.

The processor architecture 102 is configured to communicate with system memory 104. The system memory 104 represents any non-transitory short or long term storage or other computer-readable media capable of storing programming instructions for execution on the processor architecture 102, including any sort of random access memory (RAM), read only memory (ROM), flash memory, magnetic or optical mass storage, and/or the like. It should be noted that the system memory 104 represents one suitable implementation of such computer-readable media, and alternatively or additionally, the processor architecture 102 could receive and cooperate with external computer-readable media realized as a portable or mobile component or application platform, e.g., a portable hard drive, a USB flash drive, an optical disc, or the like.

The flight crew interface 106 is configured to receive input from one or more flight crew members, and to convey the received user input to a mechanical flight control system 108. The flight crew interface 106 is generally implemented as a control wheel or column in the cockpit of the aircraft. In certain embodiments, the flight crew interface 106 may further include left and/or right control pedals. A flight crew member may use the cockpit control wheel or column of the mechanical flight control system 108, to push forward, pull backward, or rotate left or right. In addition, a flight crew member may exert pressure to push down one or more control pedals. In certain embodiments, received user input may result in an external load disturbance, requiring additional functionality of the load compensation system 100, described in more detail below.

Generally, a load compensation system 100 includes a mechanical flight control system 108 with flight envelope protection (FEP) functionality provided by means of one or more torque controlled servos 110. A mechanical flight control system 108 may be defined as a flight control system that is mechanically linked, including but not limited to, coupled cables and pulleys between a flight crew interface 106 in an aircraft and apparatus located next to the control surfaces of an aircraft (e.g., aileron, elevator, rudder, etc.), which utilize deflections to produce aircraft motion. A mechanical flight control system 108 does not include physical parts or functionality associated with a "fly-by-wire" system or a hydromechanics system. One potential embodiment of a mechanical flight control system 108, including an FEP servo and flight crew member input "in the loop," is depicted in FIG. 2.

Figure 2:
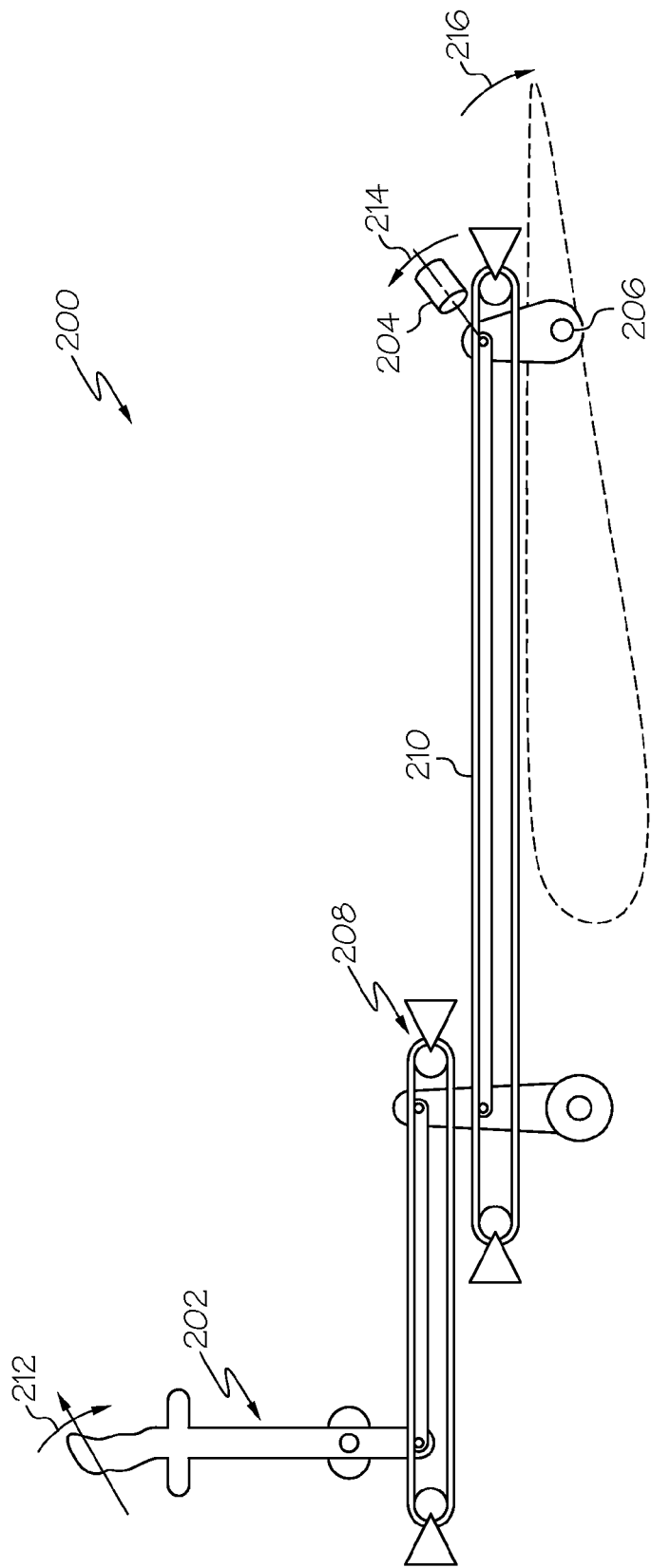
FIG. 2 is a schematic diagram representation of a mechanical flight control system, according to some embodiments.

FIG. 2 is a schematic diagram representation of a mechanical flight control system 200 (see reference 108 in FIG. 1), according to some embodiments. As described above with regard to FIG. 1, a torque-controlled servo 204 is mechanically coupled to the hands of a flight crew member via one or more cockpit control mechanisms 202 (e.g., control wheels and/or columns) through a mechanical linkage of pulleys 208 and cables 210 in an aircraft mechanical flight control actuation loop. As shown, the mechanical flight control system 200 is a force-reversible flight actuation system which has the following potential input elements: (i) force 212 exerted by a flight crew member on the one or more cockpit control mechanisms 202 (e.g., control wheels and/or columns), (ii) servo 204 torque 214, and/or (iii) aerodynamic hinge moment 216 exertion on the control surface. During any flight period, (i) and/or (ii) may exert control torque summed on the mechanical flight control system 200 control linkage and/or the aircraft surface during a continuously present (iii) aerodynamic hinge moment.

The aerodynamic hinge moment 216 is the rotational torque about the pivot point 206 shown in FIG. 2. The aerodynamic hinge moment 216 is always present during the flight period and is considered the resistant load in the flight control system. When compared to the flight crew's input torque 212 and the resultant induced back EMF force from the servo, the aerodynamic hinge moment 216 (in its capacity as a resistant load) is a more smooth and consistent load exerted on the control surface and felt in the hands of the flight crew. Thus, this consistent aerodynamic hinge moment 216 is not the focus of the load compensation techniques described in more detail with regard to FIGS. 1 and 3-7.

Here, the mechanical flight control system 200 is configured to receive input from a flight crew member "in the loop" via the one or more cockpit control mechanisms 202 in the cockpit. These input commands are not forecasted, and are categorized into two potential interactions between the flight crew member and the actuation servo 204 under this "pilot in the loop" condition: either (1) the input torque 212 resists the servo torque 214; or (2) the input torque 212 aids the servo torque 214. When the input torque 212 resists the servo torque 214, there is no induced back electromotive force (EMF). This resistant input torque 212 is consistent for intended FEP function and, in this case, load compensation is not required. However, when the input torque 212 aids the servo torque 214 under condition (2) and when the motion of the actuation servo 204 starts lagging behind the pilot induced surface motion, the servo 204 generates a significant resistance torque 214 induced by back EMF. It is known that the motor torque produced by back EMF is in the opposite direction with the turning direction of the servo 204, and that the magnitude of back EMF increases with rotational speed. This back EMF force feels like a "kick back" on a control mechanism 202 in the hands of a flight crew member, creating difficulty for the flight crew member to perform a recovery maneuver.

Returning to FIG. 1, the mechanical flight control system 108 is configured to operate in conjunction with one or more torque controlled servos 110. In certain embodiments, the torque controlled servos 110 may be implemented using electromechanical servos, each consisting of a brushless Permanent Magnet Direct Current (PMDC) motor. When the flight envelope protection module 112 is invoked, the mechanical flight control system 108 is engaged with at least one torque controlled servo 110. Each torque controlled servo 110 is mechanically coupled to the hands of a flight crew member, via the flight crew interface 106, in an aircraft mechanical flight control actuation loop.

The flight envelope protection (FEP) module 112 is suitably configured to provide a set of constraints to the aircraft dynamic parameters, in order to prevent flight of the aircraft outside of these constraints and to mitigate the risk of the loss of control of the aircraft. More specifically, the FEP module 112 determines the resistant torque to provide to a flight crew member (e.g., to apply to pilot's hand via the flight crew interface 106) based on the excursion level of the flight envelope, when a flight crew member is manually flying the aircraft outside of the flight envelope. In addition, the FEP module 112 commands little or no resistance torque from the servo 110 when a flight crew member is performing a recovery maneuver and brings the aircraft back inside the flight envelope parameters. Thus, the FEP module 112 modulates servo 110 torque so that the applied torque from a servo 110 augments the manually applied torque from a flight crew member, to safely and effectively contribute to the deflection of the flight control surfaces.

The FEP module 112 generates a servo torque command for the torque control module 114 based on a flight status of the aircraft, including without limitation: roll attitude, pitch attitude, angle of attack, speed, and/or aircraft load. Since in general the PMDC motor torque is proportional to the root mean square values of the current, the control of the servo torque is equivalent to the control of the current. Thus, this servo torque command to the control loop is further derived into the servo current command to the torque control module 114 (described in more detail in FIG. 5). As an example to illustrate this FEP practice for roll attitude envelope protection, the direction of the servo resistance torque is determined by the direction of the desirable aerodynamic restoring rolling moment to bring the aircraft back into the roll attitude envelope. This rolling moment induces a reduction of the attitude magnitude. The magnitude of servo resistance torque is determined by the difference of the measured aircraft roll attitude compared to the specified roll attitude envelope point. As is well-known to a person of ordinary skill in the art, the aircraft restoring rolling moment is a direct outcome of the operations of ailerons (i.e., the aileron deflection direction and magnitude and duration of the deflection time).

The torque control module 114 is configured to provide instructions to, and control the operation of, the one or more electromechanical servos 110. Since the current is directly related to the torque produced by the one or more electromechanical servos 110, the current control loop provides the torque required, based on the FEP module 112. The torque control module 114, the servo command augmentation module 118, or a combination of both, starts from the current command and consists of the outer current control loop and inner position control loop (described in further detail with regard to FIG. 5).

The feedback analysis module 116 is suitably configured to receive and analyze one or more feedback signals from a servo 110 of the mechanical flight control system 108. The feedback analysis signals may include, without limitation: servo position and/or signals derived from the servo position, current measurement and/or signals derived from the current measurement. In some embodiments, these signals may be equivalently sensed as the load or force measurements using strain gauges. Analysis of the feedback signals may detect user input (in the form of an external load disturbance), or a lack thereof, to the servo 110 of the mechanical flight control system 108, and the feedback analysis module 116 is further configured to communicate this information to the torque control module 114 and/or servo command augmentation module 118 for further use. Additionally, the feedback analysis module 116 may identify and evaluate the intended and actual performance of the servo 110, including without limitation: actual acceleration being performed by the servo 110, programmed acceleration values for use by the servo command augmentation module 118, or the like.

The servo command augmentation module 118 is configured to supplement servo commands generated by the torque control module 114, based on data obtained by the feedback analysis module 116. In certain embodiments, the servo command augmentation module 118 provides command signal augmentation based on a position measurement signal from a servo 110. In some embodiments, the servo command augmentation module 118 provides signal augmentation based on a current measurement signal from a servo 110. Exemplary embodiments of the operation of the servo command augmentation module 118 are presented with regard to FIGS. 5 and 6.

In practice, the FEP module 112, the torque control module 114, the feedback analysis module 116, and/or the servo command augmentation module 118 may be implemented with (or cooperate with) the processor architecture 102 to perform at least some of the functions and operations described in more detail herein. In this regard, the FEP module 112, the torque control module 114, the feedback analysis module 116, and/or the servo command augmentation module 118, may be realized as suitably written processing logic, application program code, or the like.

Figure 3:
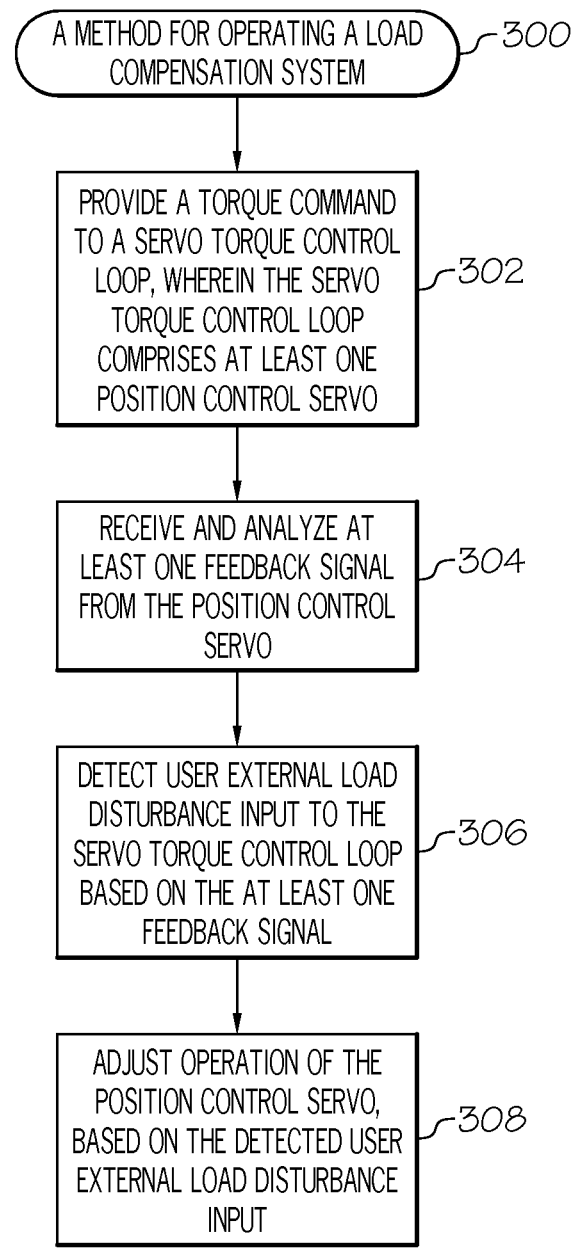
FIG. 3 is a flow chart that illustrates an embodiment of a process for operating a load compensation system.

FIG. 3 is a flow chart that illustrates an embodiment of a process 300 for operating a load compensation system. In certain embodiments, a load compensation system is used in a mechanical flight control system, which includes one or more torque controlled servos, and provides load compensation functionality to the position control servos when required. First, the process 300 provides a torque command to a servo torque control loop, wherein the servo torque control loop comprises at least one position control servo (step 302).

Next, the process 300 receives and analyzes at least one feedback signal from the position control servo (step 304). In certain embodiments, a servo feedback signal may comprise servo measurement signals, including position and its derived velocity, acceleration, and servo current signals. The process 300 then detects user external load disturbance input to the servo torque control loop based on the at least one feedback signal (step 306). One suitable methodology for detecting user external load disturbance input to the servo torque control loop is described below with reference to FIG. 4. Generally, one or more feedback signals provide performance data of the servo used for monitoring to ensure the servo is performing within its design limits or as it was commanded. When an external load disturbance is present, the feedback signals might temporarily increase or decrease in magnitude (or some other characteristic), indicating a deviation from the commanded operation and/or performance of the servo.

Figure 5:
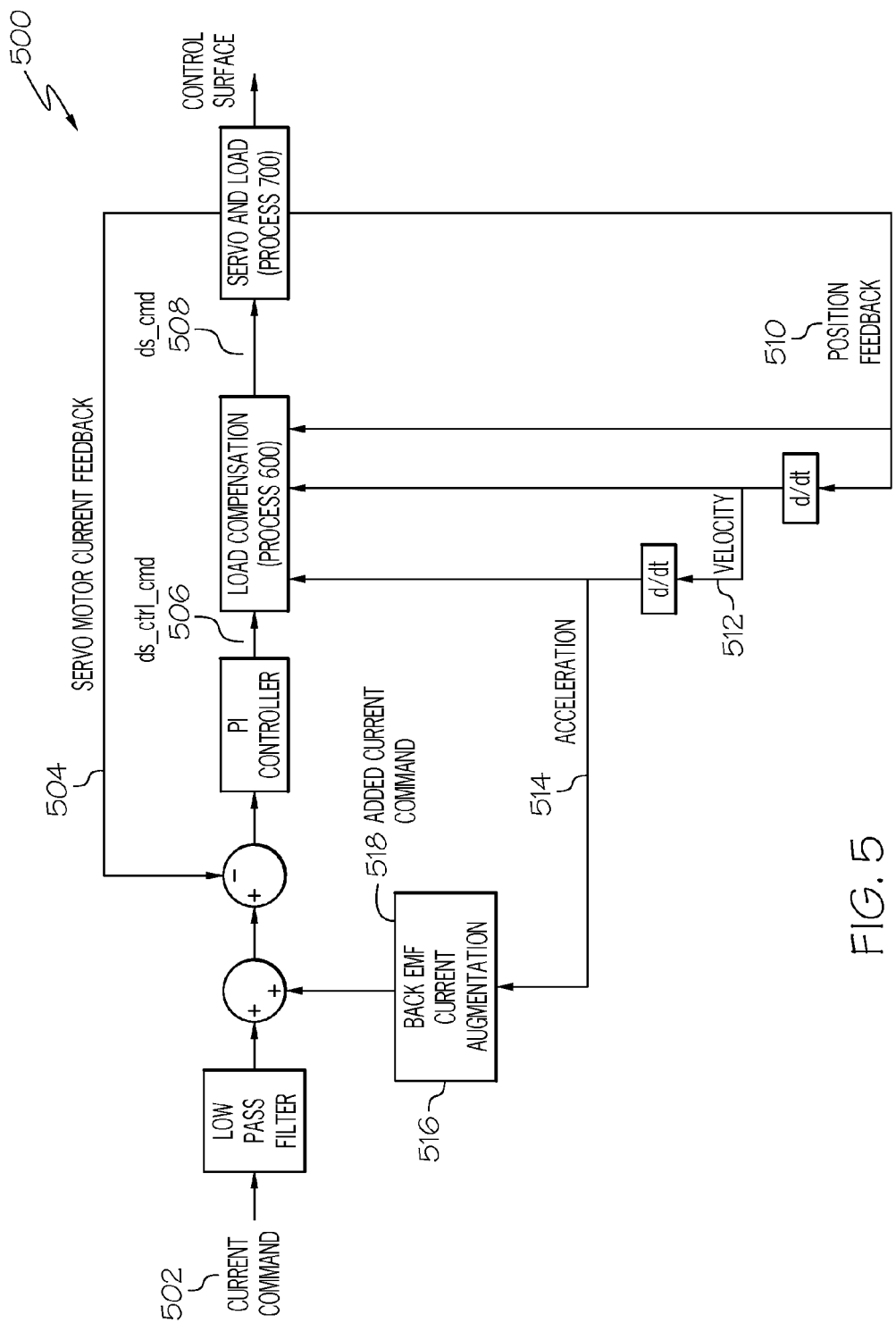
FIG. 5 is an embodiment of a process for operating a torque controller servo with the current command in a mechanical flight control system.
Figure 6:
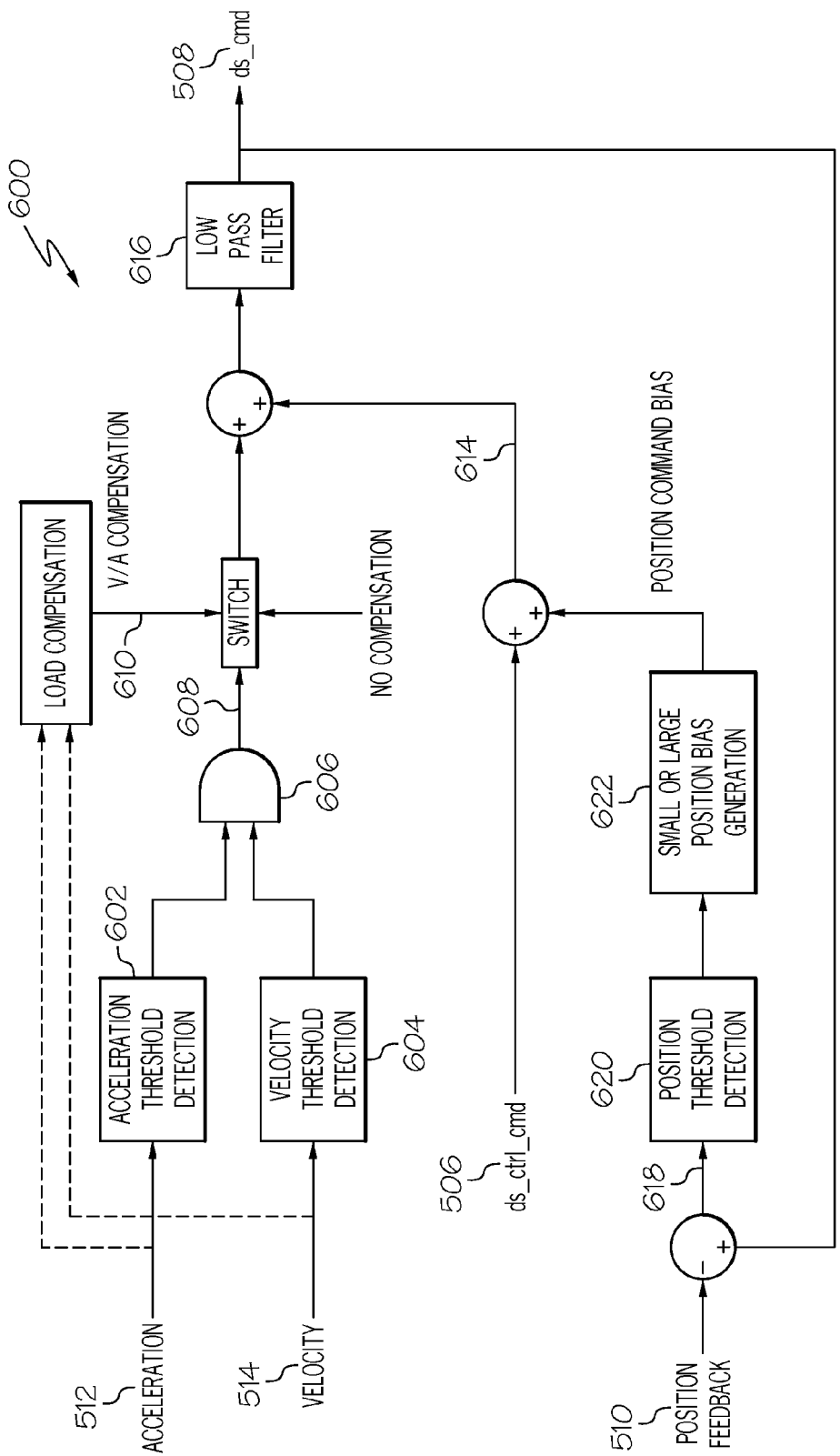
FIG. 6 is a schematic diagram that illustrates an embodiment of a process for detecting the need for load compensation to the position control command.

After detecting user external load disturbance input to the servo torque control loop (step 306), the process 300 adjusts operation of the position control servo, based on the detected user external load disturbance input (step 308). Generally, this adjustment in operation of the position control servo comprises servo position command augmentation and servo current command augmentation to provide load compensation. When the process 300 detects that a flight crew member (i.e., a user) has provided input to the mechanical flight control system (step 306), the servo operation commands, including the servo torque command and servo position command, are altered or augmented to provide load compensation. When it is determined that there is no user external load disturbance, the torque commands from (step 302) are not altered. One particular embodiment of the torque command is illustrated in FIGS. 5 and 6 (see reference 502).

Figure 4:
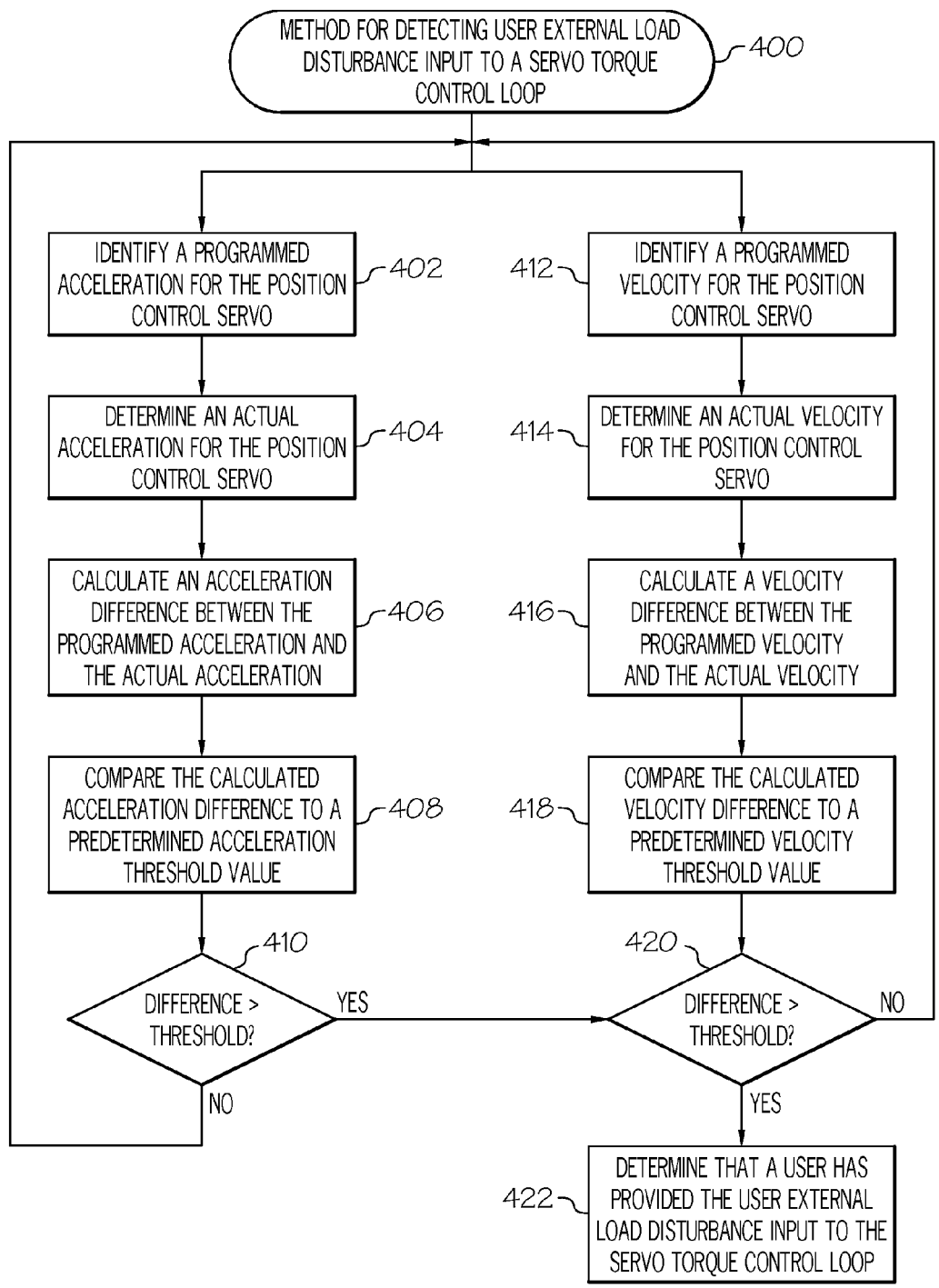
FIG. 4 is a flow chart that illustrates an embodiment of a process for detecting user external load disturbance input to a servo torque control loop.

FIG. 4 is a flow chart that illustrates an embodiment of a process 400 for detecting user input to a mechanical flight control system. It should be appreciated that the process 400 described in FIG. 4 represents one embodiment of step 306 described above in the discussion of FIG. 3, including additional detail. First, the process 400 identifies a programmed acceleration (step 402) and a programmed velocity (step 412) for a position control servo. The programmed acceleration and velocity values are values that have been predefined and stored within the system; these are the maximum expected acceleration and velocity values at which the position control servo should operate, under normal conditions, in the absence of any load disturbance from flight crew member input (wherein the position control servo is controlled by the aircraft, until the programmed acceleration and/or programmed velocity is changed/altered by the developer).

Next, the process 400 determines an actual acceleration (step 404) and an actual velocity for the position control servo (step 414). The actual acceleration and actual velocity are measured values at which the position control servo is operating, regardless of the programmed acceleration and programmed velocity.

The process 400 then calculates an acceleration difference between the programmed acceleration value and the actual acceleration value (step 406), and a velocity difference between the programmed velocity value and the actual velocity value (step 416). The process 400 then compares the calculated acceleration difference to a predetermined acceleration threshold value (step 408), and compares the calculated velocity difference to a predetermined velocity threshold value (step 418). If the calculated acceleration difference is not greater than the predetermined threshold, (the "No" branch of 410), the process 400 determines that a user has not provided external load disturbance input to the servo torque control loop. Here, the process 400 returns to the beginning of the process 400 to continually seek actual acceleration values that indicate received user external load disturbance input, when compared to a programmed acceleration value.

If the calculated acceleration difference is greater than the predetermined acceleration threshold (the "Yes" branch of 410), then the process 400 determines whether the velocity difference is greater than the predetermined velocity threshold (step 420). If the velocity difference is not greater than the predetermined velocity threshold (the "No" branch of 420), then the process 400 determines that a user has not provided external load disturbance input to the servo torque control loop, and the process 400 returns to the beginning of the process 400. However, if the velocity difference is greater than the predetermined velocity threshold (the "Yes" branch of 420), then the process 400 determines that a user has provided user input, in the form of an external load disturbance, to the servo torque control loop (step 422).

The various tasks performed in connection with processes 300 and 400 (described with regard to FIGS. 3 and 4) may be performed by software, hardware, firmware, or any combination thereof. For illustrative purposes, the preceding descriptions of processes 300 and 400 may refer to elements mentioned in connection with FIGS. 1 and 2. In practice, portions of processes 300 and 400 may be performed by different elements of the described system. It should be appreciated that processes 300 and 400 may include any number of additional or alternative tasks, the tasks shown in FIGS. 3 and 4 need not be performed in the illustrated order, and processes 300 and 400 may each be incorporated, individually or in combination, into a more comprehensive procedure or process having additional functionality not described in detail herein. Moreover, one or more of the tasks shown in FIGS. 3 and/or 4 could be omitted from an embodiment of one or more of the processes 300 or 400 as long as the intended overall functionality remains intact.

FIG. 5 is an embodiment of a process 500 for operating a torque controller servo with the current command in a mechanical flight control system, in which flight crew member input is "in the loop". In certain embodiments, the mechanical flight control system includes one or more torque controlled servos with a position control inner loop, and process 500 provides load compensation functionality to the servos when required.

At the top level of the process 500, the outer current control loop applies a current command 502 and utilizes the current feedback 504 with a Proportional-Integral (PI) controller to generate a position control command 506. The position control command 506 is further processed, as illustrated in FIG. 6, to generate a position command 508 to the servo position control loop which moves the servo and loaded control surface.

First, the process 500 receives the current command 502, and then detects user external load disturbance input to the servo torque control loop through analysis of feedback signals provided by torque controlled servos. One suitable methodology for detecting user external load disturbance input to the servo torque control loop is described as follows: the feedback signal usually includes servo position 510, motor current 504, and/or servo acceleration 514, which can be generated based on the second derivative of measured position with respect to time. However, when a flight crew member provides input (in the form of an external load disturbance) to the servo torque control loop of the mechanical flight control system, the feedback signal is augmented to include the augmented current value based on measured or derived servo acceleration 514. After detecting user external load disturbance input to the servo torque control loop (step 516), the process 500 adjusts operation of the commanded current with additional current command 518 as a load compensation to increase the current command value originally generated.

The process 500 next receives a current feedback signal 504 from the servo during operation of the position control servo, wherein the current feedback signal 504 comprises servo motor current. During normal operation of the position controlled servo, the current feedback signal is compared with the command current and passed through Proportional-Integral (PI) compensation. This compensation provides the position control command 506, which can be used for process 600 (as illustrated in FIG. 6).

FIG. 6 is a schematic diagram that illustrates an embodiment of a process 600 for detecting the need for load compensation to the position control command. It should be appreciated that the process 600 described in FIG. 6 represents one embodiment of steps 506 and 508 described above with regard to FIG. 5, including additional detail. At position 602, the process 600 identifies a programmed acceleration value and an actual acceleration value for a position controlled servo. This programmed acceleration value is an acceleration value that has been predefined and stored within the system; this is the acceleration value below which the position controlled servo should operate, under normal conditions. When the need for load compensation is determined, the position control command derived from the commanded current (e.g., as described above with regard to the current control loop of FIG. 5), is compensated to create a position command and this position command is fed into the servo position command path. With the feedback of the servo derived acceleration 514, the load compensation is further determined as described in more detail below.

The process 600 calculates a difference between the programmed acceleration value and the actual acceleration value 514, and compares the calculated difference to a predetermined acceleration threshold value. If the calculated difference is not greater than the predetermined acceleration threshold, the process 600 determines that the load compensation is not needed for the mechanical flight control system. At the same time, the process 600 also calculates a difference between a programmed velocity value and a detected, actual velocity value 512, and compares the calculated difference to a predetermined velocity threshold value (block 604). If the calculated difference is not greater than the predetermined velocity threshold, the process 600 determines that the load compensation is not needed.

When it has been determined that no load compensation is required, the switch 608 is off and adds no compensation to the signal 614. With the "AND" logic gate 606, when both acceleration threshold 602 and velocity threshold 604 are exceeded, the process 600 determines that switch 608 is on and adds the load compensation signal 610 to signal 614. The load compensation value 610 is calculated based on the measured acceleration 514 and velocity 512. The added load compensation 610 to the signal 614 is passed through a low pass filter 616 to provide the servo position command 508, which is the position command applied to the servo and load in process 700 (as illustrated in FIG. 7).

In FIG. 6, the position feedback signal 510 is subtracted from the calculated servo position command signal 508, and the difference is further modified with a predetermined position threshold (block 620). When the difference is greater than or equal to the threshold, a larger position command bias signal 622 is generated and added to the position control command 506. When the difference is smaller than the threshold, a smaller position command bias signal 622 is generated and added to the position control command 506. Therefore, as described previously, the position command 506 is modified with load compensation 610 and position command bias 622, depending on the given threshold detection and switch logics. The load compensation functionality described with respect to FIGS. 5 and 6 results in a servo position command that is substantially different than the position control command 506 that would be generated in its absence. The compensated servo position command enables the servo to accelerate faster thereby preventing the back EMF and subsequent resistive force that would interfere with manual operations performed by flight crew members.

Figure 7:
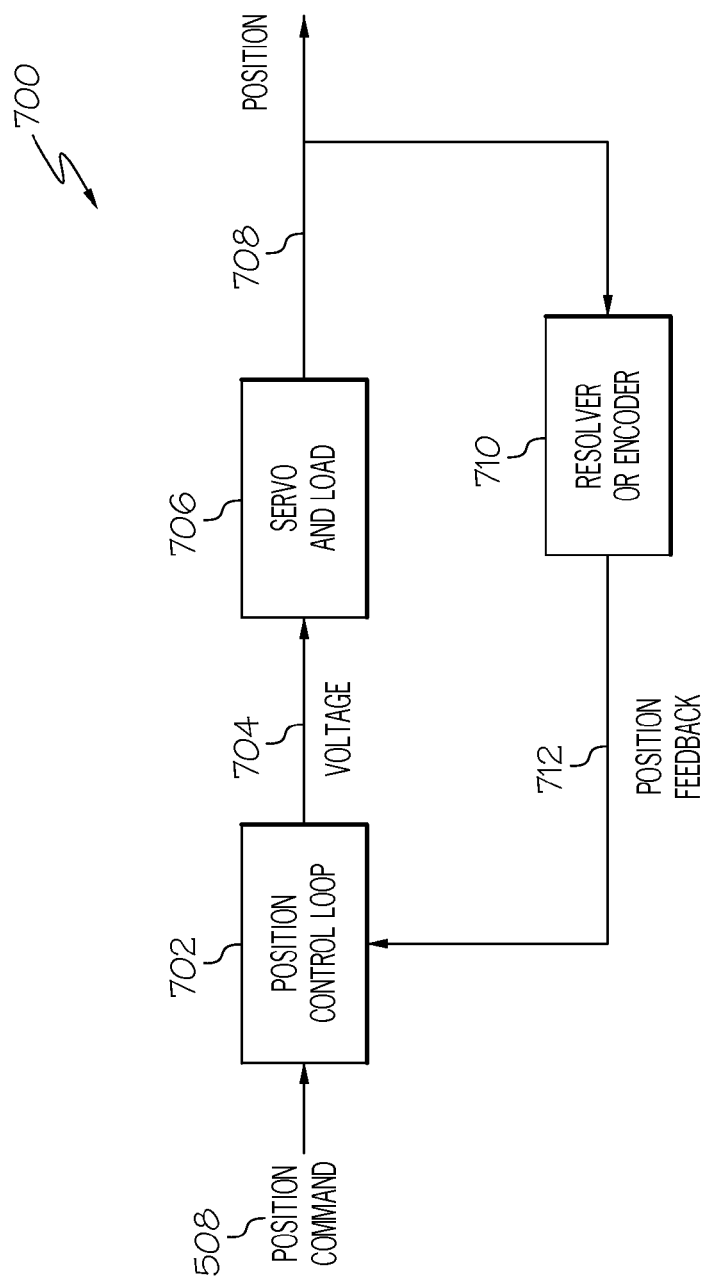
FIG. 7 is a schematic diagram that illustrates an embodiment of a process for general control and response of a servo and load mechanism.

FIG. 7 is a schematic diagram that illustrates an embodiment of a process 700 for general control and response of a servo and load mechanism. The position command 508 (see process 500 in FIG. 5) is used by the Position Control Loop 702 to generate the servo voltage signal 704 which is applied to the electromechanical servo consisting of a brushless permanent magnet direct current (PMDC) motor. This Position Control Loop 702 can be any standard servo position control design with the position feedback signal 712. The voltage signal 704 will generate the torque to move the servo with its load 706. The resulted response of the servo and load is the position response signal 708. A resolver or encoder 710 can be applied to measure the position 708 to generate the feedback signal 712.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium", "computer-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for operating a mechanical flight control system, the method comprising:
   providing a torque command to a servo torque control loop, wherein the servo torque control loop comprises at least one position control servo;
   receiving at least one feedback signal from the position control servo, during operation of the position control servo;
   detecting user external load disturbance input to the servo torque control loop, based on the at least one feedback signal;
   adjusting operation of the position control servo, based on the detected user external load disturbance input;
   determining whether the user external load disturbance input indicates a first increase in acceleration of the position control servo in combination with a second increase in velocity of the position control servo; and
   determining that a user has provided input to the servo torque control loop, based on the indicated first increase and the indicated second increase.

2. The method of claim 1, wherein the detecting step further comprises:
   identifying an actual acceleration value and an actual velocity value of the position control servo;
   determining that the actual acceleration value is greater than a programmed acceleration value of the position control servo and that the actual velocity value is greater than a programmed velocity value of the position control servo;
   wherein a combination of the greater actual acceleration value and the greater actual velocity value indicates the detected user external load disturbance input.

3. The method of claim 1, wherein the detecting step further comprises:
   identifying a programmed acceleration and a programmed velocity for the position control servo;
   determining an actual acceleration and an actual velocity for the position control servo;
   calculating a first difference between the programmed acceleration and the actual acceleration and a second difference between the programmed velocity and the actual velocity; and
   when the first difference is greater than a first predetermined threshold, and the second difference is greater than a second predetermined threshold, determining that a user has provided input to the servo torque control loop.

4. The method of claim 1, further comprising:
   determining whether the user external load disturbance input aids current operation of the position control servo; and
   when the user external load disturbance input aids current operation of the position control servo, instructing the position control servo to provide no deterrent resistant torque.

5. The method of claim 1, further comprising:
   determining whether the user external load disturbance input aids current operation of the position control servo; and
   when the user external load disturbance input does not aid current operation of the position control servo, providing deterrent resistant torque.

6. The method of claim 1, wherein the mechanical flight control system is configured to operate within a set of flight envelope protection (FEP) limits; and wherein the position control servo comprises an FEP servo.

7. The method of claim 1, further comprising:
   prior to operation of the position control servo, generating a servo torque command for the position control servo, based on an identified flight status of the aircraft;
   detecting the user external load disturbance input; and
   augmenting the servo torque command to perform the adjusting step.

8. A system for operating a servo torque control loop of an aircraft, the system comprising:
   a processor;
   a flight envelope protection (FEP) module, executed by the processor, configured to provide a set of FEP limits for the operation of the aircraft, wherein the servo torque control loop comprises at least one position control servo;
   a feedback analysis module, executed by the processor, configured to receive and analyze a feedback signal from the position control servo during operation of the position control servo; and
   a servo control module, executed by the processor, configured to operate the position control servo in the aircraft within the set of FEP limits provided by the FEP module, and to adjust operation of the position control servo based on analysis of the feedback analysis module;
   wherein the feedback analysis module is further configured to:
   identify a programmed acceleration and a programmed velocity for the position control servo;
   determine an actual acceleration and an actual velocity for the position control servo;
   calculate a first difference between the programmed acceleration and the actual acceleration, and a second difference between the programmed velocity and the actual velocity;
   compare the first calculated difference to a first predetermined threshold value, and the second calculated difference to a second predetermined threshold value; and
   when the first calculated difference is greater than the first predetermined threshold, and the second calculated difference is greater than the second predetermined threshold, determine that a user has provided external load disturbance input to the servo torque control loop.

9. The system of claim 8, wherein the feedback analysis module is further configured to detect user external load disturbance input to the servo torque control loop; and
   wherein the servo control module is further configured to control the actual acceleration of the position control servo based on the detected user external load disturbance input.

10. The system of claim 8, wherein the feedback analysis module is further configured to:
    determine whether the user external load disturbance input comprises aid to the operation of the position control servo; and
    when the user external load disturbance input comprises aid to the operation of the position control servo, instruct the position control servo to provide no deterrent resistant torque.

11. The system of claim 8, wherein the feedback analysis module is further configured to:
    determine whether the user external load disturbance input comprises aid to the operation of the position control servo within the set of FEP limits; and when the user external load disturbance input does not comprise aid to the operation of the position control servo, permit transmission of a deterrent resistant torque from the position control servo.

12. The system of claim 8, wherein the feedback analysis module is further configured to determine whether the user external load disturbance input indicates a first increase in acceleration and a second increase in velocity of the position control servo; and
   wherein the servo control module is further configured to adjust operation of the position control servo based on the indicated first increase and second increase.

13. A non-transitory, computer-readable medium containing instructions thereon, which, when executed by a processor, perform a method comprising:
   analyzing a feedback signal from a position control servo of a servo torque control loop of an aircraft to determine whether a user has provided external load disturbance input to the servo torque control loop, wherein the feedback signal is analyzed during operation of the position control servo;
   adjusting operation of the position control servo, based on user external load disturbance input indicated by the feedback signal; and
   identifying an actual acceleration value of the position control servo and an actual velocity value of the position control servo, wherein the actual acceleration value comprises a first larger value than a programmed acceleration value of the position control servo, and wherein the actual velocity value comprises a second larger value than a programmed velocity value of the position control servo;
   wherein a condition of the first larger value and the second larger value indicates the indicated user input.

14. The non-transitory, computer-readable medium of claim 13, further comprising:
   determining whether the user external load disturbance input indicates a first difference between the actual acceleration value and the programmed acceleration value and a second difference between the actual velocity value and the programmed velocity value of the position control servo; and
   performing the adjusting step based on the first difference and the second difference.

15. The non-transitory, computer-readable medium of claim 13, further comprising:
   prior to operation of the position control servo, generating a servo torque command for the position control servo, based on an identified flight status of the aircraft;
   detecting the user external load disturbance input; and
   augmenting the servo torque command to perform the adjusting the position control servo.

* * * * *